(12) United States Patent
Xu

(10) Patent No.: US 12,211,171 B2
(45) Date of Patent: Jan. 28, 2025

(54) METHOD AND DEVICE FOR PROCESSING POINT CLOUD

(71) Applicant: SHENZHEN ZHUOYU TECHNOLOGY CO., LTD., Shenzhen (CN)

(72) Inventor: Bin Xu, Shenzhen (CN)

(73) Assignee: SHENZHEN ZHUOYU TECHNOLOGY CO., LTD., Shenzhen (CN)

( * ) Notice: Subject to any disclaimer, the term of this patent is extended or adjusted under 35 U.S.C. 154(b) by 389 days.

(21) Appl. No.: 17/406,062

(22) Filed: Aug. 18, 2021

(65) Prior Publication Data

US 2022/0005154 A1 Jan. 6, 2022

Related U.S. Application Data

(63) Continuation of application No. PCT/CN2019/098449, filed on Jul. 30, 2019.

(51) Int. Cl.
| | |
|---|---|
| G06K 9/00 | (2022.01) |
| G06T 3/40 | (2006.01) |
| G06T 7/13 | (2017.01) |
| G06T 7/33 | (2017.01) |
| G06T 7/90 | (2017.01) |
| G06T 17/20 | (2006.01) |

(52) U.S. Cl.
CPC .............. *G06T 3/40* (2013.01); *G06T 7/13* (2017.01); *G06T 7/344* (2017.01); *G06T 7/90* (2017.01); *G06T 17/205* (2013.01); *G06T 2207/10028* (2013.01); *G06T 2207/20024* (2013.01)

(58) Field of Classification Search
None
See application file for complete search history.

(56) References Cited

U.S. PATENT DOCUMENTS

| | | | |
|---|---|---|---|
| 2017/0039436 A1 | 2/2017 | Chen et al. | |
| 2018/0122137 A1* | 5/2018 | Tian | G06T 17/00 |

(Continued)

FOREIGN PATENT DOCUMENTS

| | | | |
|---|---|---|---|
| CN | 101825442 A | | 9/2010 |
| CN | 104952107 A | * | 9/2015 |

(Continued)

OTHER PUBLICATIONS

International Search Report of PCT/CN2019/098449 (Apr. 15, 2020).

*Primary Examiner* — Wei Wen Yang

(57) ABSTRACT

Provided is a method for processing a point cloud, including: acquiring a first point cloud; acquiring an image of a same environment corresponding to the first point cloud; resampling the first point cloud to obtain a second point cloud with a density lower than that of the first point cloud; registering the second point cloud and the image; and processing the second point cloud according to the image to generate a target point cloud containing a color. Since a color of the image shot by a camera may reflect a real driving environment, the above-mentioned solution may provide a more intuitive visual point cloud for a driver to facilitate the driver performing certain complex operations including backing, lane changing, overtaking, and the like, based on the target point cloud.

18 Claims, 2 Drawing Sheets

(56) References Cited

U.S. PATENT DOCUMENTS

| | | | | |
|---|---|---|---|---|
| 2019/0258225 A1* | 8/2019 | Link | ............... | G05B 19/4097 |
| 2020/0272816 A1* | 8/2020 | Endres | ............... | G06V 10/945 |

FOREIGN PATENT DOCUMENTS

| CN | 106407947 A | 2/2017 |
|---|---|---|
| CN | 107194983 A | 9/2017 |
| CN | 107392247 A | 11/2017 |
| CN | 108876935 A | 11/2018 |
| CN | 109683175 A | 4/2019 |
| CN | 109964222 A | 7/2019 |
| CN | 110045729 A | 7/2019 |

\* cited by examiner

METHOD AND DEVICE FOR PROCESSING POINT CLOUD

RELATED APPLICATIONS

This application is a continuation application of PCT application No. PCT/CN2019/098449, filed on Jul. 30 2019, and the content of which is incorporated herein by reference in its entirety.

COPYRIGHT NOTICE

The disclosure of this patent document contains material which is subject to copyright protection. The copyright is owned by the copyright owner. The copyright owner has no objection to the facsimile reproduction by anyone of the patent document or the patent disclosure, as it appears in the Patent and Trademark Office official records and files.

TECHNICAL FIELD

The present disclosure relates to the field of autonomous driving technologies, and more particularly to a method and device for processing a point cloud.

BACKGROUND

A point cloud is an expression form of a 3D object or a 3D scenario, and is formed by a set of randomly distributed discrete points (i.e., point cloud data) in a space, the point cloud data may be used to characterize a spatial structure of the 3D object or scenario, and generally, one piece of point cloud data may be composed of position information.

To facilitate a driver to learn surroundings, an autonomous vehicle may present the point cloud to the driver, for example, display the point cloud on a screen or project the point cloud on a window. In order to allow the driver to know the surroundings more intuitively, a method for presenting a point cloud may include coloring the point cloud and then presenting the point cloud to the driver. However, color(s) of the point cloud obtained by coloring the point cloud directly may have a large deviation from color(s) of a real environment.

SUMMARY

The present disclosure provides a method for processing a point cloud, which may provide a more intuitive visual point cloud for a driver.

In a first aspect, a method for processing a point cloud is provided, including: obtaining a first point cloud of an environment; obtaining an image of the environment; resampling the first point cloud to obtain a second point cloud with a density lower than a density of the first point cloud; registering the second point cloud and the image; and processing the second point cloud according to the image to generate a target point cloud containing colors.

In a second aspect, a mobile platform is provided, including: a point cloud sensor; a vision sensor; at least one storage medium storing a set of instructions for doing processing a point cloud; and at least one processor in communication with the at least one storage medium, where during operation, the at least one processor executes the set of instructions to: control the point cloud sensor to obtain a first point cloud, control the vision sensor to obtain an image of a same environment corresponding to the first point cloud, resample the first point cloud to obtain a second point cloud with a density lower than a density of the first point cloud, register the second point cloud and the image, and process the second point cloud according to the image to generate a target point cloud containing colors.

DETAILED DESCRIPTION

The technical solutions in some exemplary embodiments of the present disclosure will be described below with reference to accompanying drawings.

Unless defined otherwise, all technical and scientific terms used herein have the same meaning as commonly understood by a person skilled in the art to which the present disclosure pertains. The terminology used herein is for the purpose of describing some exemplary embodiments and is not intended to limit the present disclosure.

A method for processing a point cloud according to the present disclosure may be applied to a mobile platform, which may include, but is not limited to, an autonomous vehicle. The autonomous vehicle is also referred to as an unmanned vehicle, may acquire environmental information by a sensor(s), such as a radar, or the like, and may be controlled to travel according to the environmental information, which reduces the time for a driver to control the vehicle; therefore, the autonomous vehicle has advantages of reducing traffic violations, and the like.

However, in an evolution process of the autonomous driving technology, a driver needs to participate in a driving process to different degrees, such that visual presentation of a driving environment to the driver may facilitate the driver making better decisions, such as backing, lane changing, overtaking, etc.

It should be noted that in the present disclosure, the driver may drive the mobile platform in the mobile platform, for example, control the autonomous vehicle inside the autonomous vehicle; or the driver may drive the mobile platform from outside the mobile platform, for example, control a drone or an unmanned underwater vehicle with a remote control device.

Figure 1:
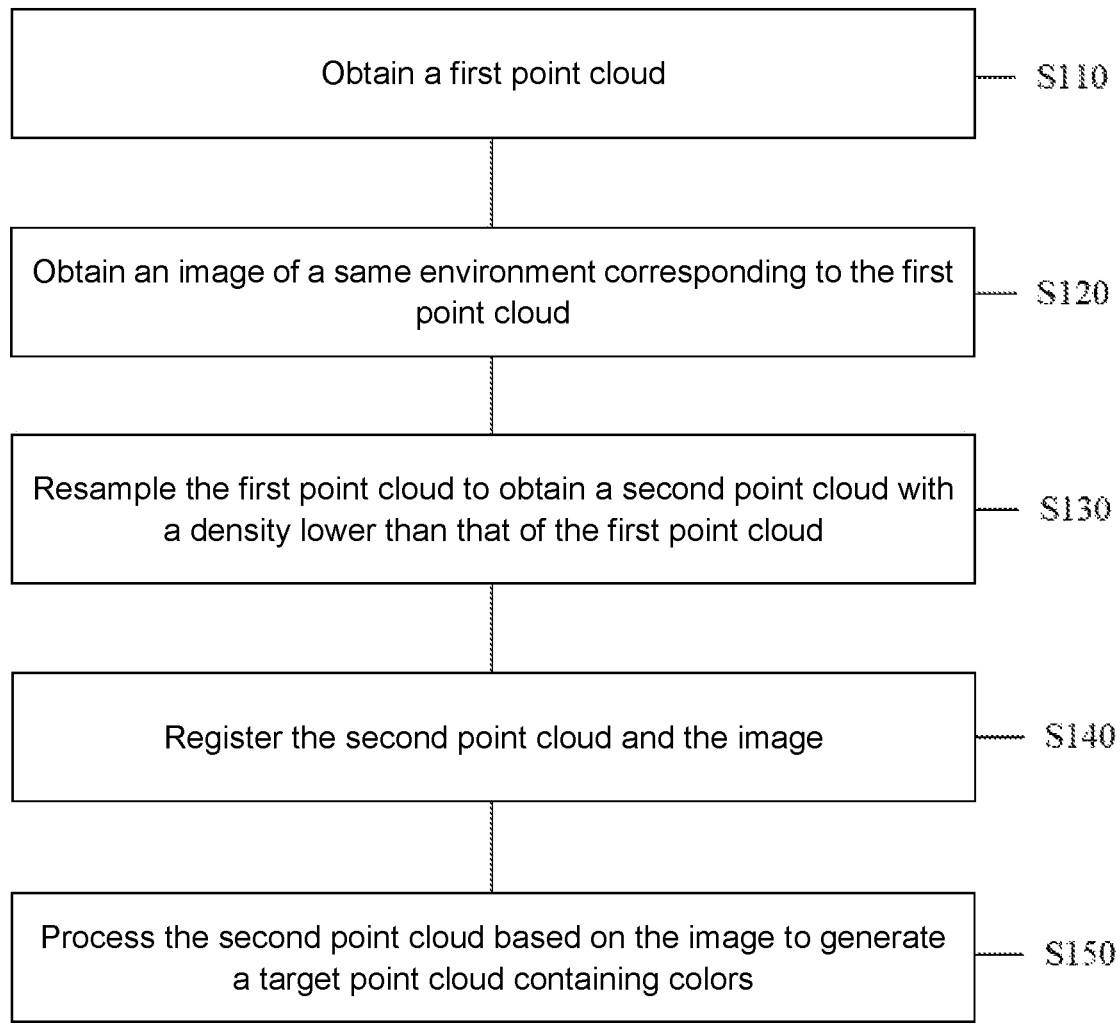
FIG. 1 is a schematic diagram of a method for processing a point cloud according to the present disclosure.

To reduce a cost of visualization, the driving environment may be presented using the existing sensor(s) of the autonomous vehicle. For example, a point cloud generated by a lidar may be processed and presented to the driver. FIG. 1 shows a method for processing a point cloud according to the present disclosure. The method 100 may include the following steps.

S110: acquire a first point cloud.

S110 may be executed by a processor(s), such as a central processing unit (CPU). The CPU may acquire the first point cloud shot by a lidar through a communication interface, or process a point cloud shot by the lidar to generate the first point cloud, and a specific way of acquiring the first point cloud is not limited in the present disclosure.

S110 may also be performed by an autonomous vehicle including a processor(s) and a lidar. After shot by the lidar, the point cloud may be transmitted to the processor(s) in real time to facilitate the processor to execute subsequent steps.

The above-mentioned lidar for generating the first point cloud is only taken as an example, an apparatus for generating the point cloud is not limited in the present disclosure, for example, the first point cloud may be generated by a millimeter wave radar.

The processor may obtain the first point cloud(s) from one or more lidars. For example, the processor may acquire a plurality of point clouds from a plurality of lidars, and splices the plurality of point clouds into the first point cloud. In some exemplary embodiments, the processor may register the plurality of point clouds (that is, splice and/or align the plurality of point clouds) using an Iterative Closest Point (ICP) algorithm, so as to obtain the first point cloud.

The processor may splice the plurality of point clouds into the first point cloud based on extrinsic parameters of the plurality of lidars. The above-mentioned extrinsic parameters may be used to indicate a positional relationship of a coordinate system of each of the plurality of lidars relative to a coordinate system of the mobile platform. For example, the above-mentioned extrinsic parameters may include:

rotation parameters of the coordinate system of each of the plurality of lidars relative to the coordinate system of the mobile platform; and/or translation parameters of the coordinate system of each of the plurality of lidars relative to the coordinate system of the mobile platform.

The processor may perform S120 after completing S110, or perform S110 and S120 synchronously.

S120: acquire an image of a same environment corresponding to the first point cloud.

For example, the CPU may acquire an image taken by a camera through the communication interface. S120 may also be performed by an autonomous vehicle including a camera having a processor. The above-mentioned camera may be a color camera or a grayscale camera. Correspondingly, the image acquired by the processor may be a color image or a grayscale image.

The same environment corresponding to the image and the first point cloud may be interpreted as: two results obtained by photographing a same scene by the camera and the lidar at a same moment; or two results obtained by photographing appropriate scenes by the camera and the lidar at a same moment; or two results obtained by photographing a same scene by the camera and the lidar at adjacent moments; or two results obtained by photographing appropriate scenes by the camera and the lidar at adjacent moments.

For example, the camera may photograph a lane ahead of the vehicle at moment A to generate the image; the lidar may photograph the lane ahead of the vehicle at the moment A to generate the first point cloud; if the scene corresponding to the image is the same as the scene corresponding to the first point cloud, the image and the first point cloud may correspond to the same environment.

In another example, the camera may photograph a lane right ahead of the vehicle at the moment A to generate the image; the lidar may photograph a lane in the front left of the vehicle at the moment A to generate the first point cloud; if the scene corresponding to the image is at least partially the same as the scene corresponding to the first point cloud, the image and the first point cloud may correspond to the same environment.

In another example, the camera may photograph a lane ahead of the vehicle at the moment A to generate the image; the lidar may photograph the lane ahead of the vehicle at moment B to generate the first point cloud, and the moment A is adjacent to the moment B; if the scene corresponding to the image is at least partially the same as the scene corresponding to the first point cloud, the image and the first point cloud may correspond to the same environment.

In another example, the camera may photographs a lane right ahead of the vehicle at the moment A to generate the image; the lidar may photograph the lane in the front left of the vehicle at the moment B to generate the first point cloud, and the moment A is adjacent to the moment B; if the scene corresponding to the image is at least partially the same as the scene corresponding to the first point cloud, the image and the first point cloud may correspond to the same environment.

For the image and the first point cloud which have high similarity in the scene, the processor may control the camera and the lidar to shoot at moments as close as possible at angles as similar as possible.

S130: resample the first point cloud to obtain a second point cloud with a density lower than that of the first point cloud.

To reduce a load of the processor, the processor may resample the first point cloud to lower the density of point cloud blocks with relatively high density in the first point cloud. Both the first and second point clouds are colorless point clouds, a "colorless point cloud" refers to a point cloud without grayscale information and RGB information.

The processor may resample the first point cloud through the following steps:

determining a point cloud block in the first point cloud with a point cloud density higher than a density threshold; and resampling the point cloud block.

Some point cloud blocks with relatively high densities may exist in the first point cloud, and the processor may first identify these point cloud blocks and then resample these point cloud blocks without resampling the whole first point cloud, thereby reducing the load on the processor.

S140: register the second point cloud and the image.

The processor may register the second point cloud and the image using calibration results of the camera and the lidar, where the calibration results may be preconfigured information, for example, preconfigured extrinsic parameters between the camera and the lidar.

The processor may also register the second point cloud and the image in other ways; for example, the processor may determine same objects in the second point cloud and the image, and overlap the same objects, so as to register the second point cloud and the image.

S150: process the second point cloud based on the image to generate a target point cloud containing a color(s).

After the registration of the second point cloud and the image, the processor may process the second point cloud based on the image, that is, color the second point cloud based on a color(s) of the image, so as to generate the target point cloud containing the color(s).

For example, the processor may determine an overlapping portion(s) between the image and the second point cloud; copy a color of the overlapping portion in the image to a corresponding overlapping portion in the second point cloud. Or, the processor may determine the same objects in the image and the second point cloud, and assign a color(s) of the object in the image to a corresponding object in the second point cloud.

Through the above-mentioned steps, the processor may finally generate a point cloud containing the color(s), i.e., the target point cloud. Since the color(s) of the image shot by the camera may reflect the real driving environment, the above-mentioned solution may provide a more intuitive visual point cloud for the driver to facilitate the driver performing complex operations of backing, lane changing, overtaking, and the like, based on the target point cloud.

Due to a sparse density of the second point cloud obtained after the resampling operation, in order to improve a display effect of the visualized second point cloud, the processor may process the second point cloud through the following steps:

determining an edge of an object in the second point cloud based on the image;

filtering the second point cloud based on the edge to obtain a second point cloud with an increased density, the second point cloud with the increased density including the edge; and determining the color of the second point cloud with the increased density based on the image.

The processor may process the second point cloud using an edge preserving filter algorithm to determine the edge of the object in the second point cloud. For example, the processor may determine the point cloud block in the second point cloud corresponding to the object in the above-mentioned image using a guided filter algorithm, so as to determine the edge of the object in the second point cloud; then filter the point cloud in the edge, and increase the density of the point cloud in the edge to obtain the second point cloud with the increased density; then, determine the color of the second point cloud with the increased density based on a corresponding relationship between the image and the second point cloud. Finally, the target point cloud (i.e., the second point cloud with the increased density containing the color) with a better visualization effect may be obtained.

The above-mentioned object may be, for example, an object in the driving environment, such as an adjacent automobile, an obstacle, or the like. The above-mentioned better visualization effect may refer to richer details of the object.

The processor may directly present the target point cloud to the driver, or may present the target point cloud to the driver after processing the target point cloud based on a method described below.

For example, when an environmental region corresponding to the target point cloud is larger than a preset environmental region, the processor may further delete an unnecessary point cloud blocks from the target point cloud, where an environmental region corresponding to the unnecessary point cloud block may be located outside the preset environmental region.

The above-mentioned preset environmental region may be, for example, a region within 200 m in front of the mobile platform and within 5 m in height. oversize region that is two large is not necessary for the driver, but may even distract the driver. Thus, the above-mentioned solution may help the driver focus on the driving environment near the mobile platform, thereby improving the safety of the mobile platform. Furthermore, the load of the processor may be reduced by displaying partial content in the target point cloud.

In addition, in order to further improve the visualization effect of the target point cloud, the processor may further identify an object in the target point cloud; and replace the object in the target point cloud with a 3D model. For example, the processor may identify persons, vehicles, and traffic lights in the target point cloud, determine positions of these objects, and replace these objects in a form of point cloud with corresponding 3D models including more details.

The processor may further process the target point cloud to generate one or more mesh grids, each of which may be formed by connecting lines between three adjacent points in the target point cloud.

After obtaining the target point cloud, the processor may directly render the target point cloud, or may further process the target point cloud using the above-mentioned method and then render the processed target point cloud. For example, the processor may render the target point cloud according to a set observation angle of the driver or an observation angle preset by a program, and display the rendered target point cloud on a screen, thereby improving user experience.

Figure 2:
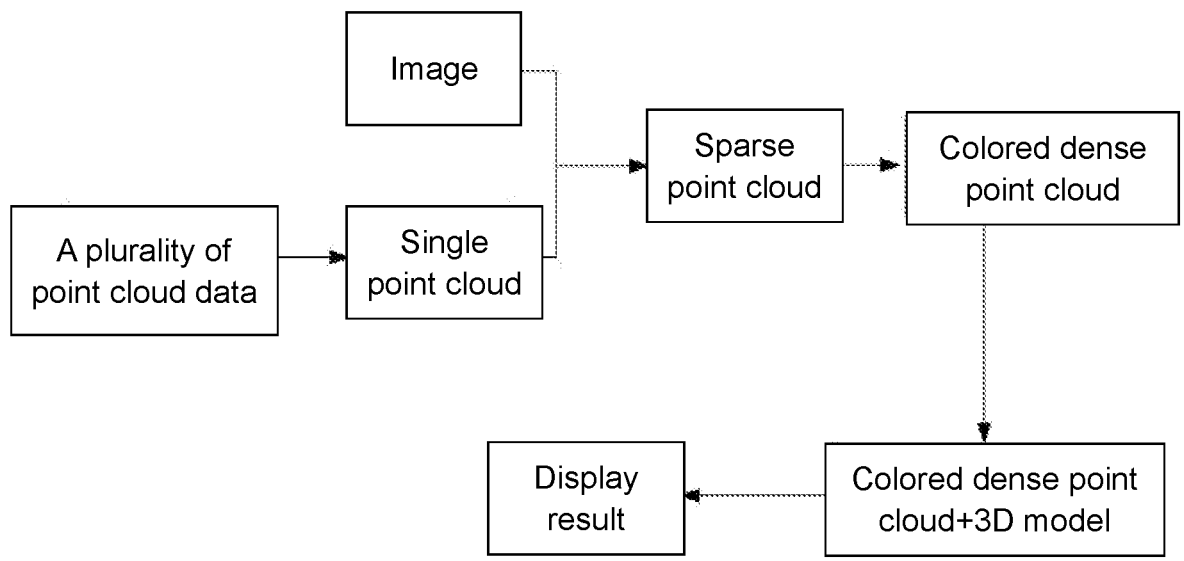
FIG. 2 is a schematic diagram of a method for processing a point cloud according to the present disclosure.

FIG. 2 shows another schematic diagram of the method for processing a point cloud according to the present disclosure.

As shown in FIG. 2, after acquiring the plural pieces of point cloud data from the lidar, the processor may merge the plural pieces of point cloud data into one point cloud (i.e., the first point cloud in the method 100), and then resample the point cloud to obtain a sparse point cloud.

Then, the processor may acquire an image from a camera, and projects the sparse point cloud onto the image using the calibration results of the camera and the lidar, so as to obtain a sparse point cloud superposed on the image.

Due to a poor visualization effect of the above-mentioned sparse point cloud superposed on the image, the sparse point cloud superposed on the image may be processed using the edge preserving filter algorithm, 3D coordinates of pixel points around the sparse point cloud may be guessed based on the consistency between the image and the sparse point cloud, and the sparse point cloud is then filled with the pixel points to obtain a colored dense point cloud. Color information of each point in the dense point cloud is a pixel value of the pixel point corresponding to the point.

The processor may detect objects in the above-mentioned dense point cloud, for example, persons, vehicles and traffic lights in the dense point cloud, as well as position information of these objects, and replace these objects with 3D models, so as to achieve a better visualization effect.

Finally, the processor may render the point cloud according to an observation angle set by the driver or an observation angle automatically set by a program, and present the point cloud on a screen.

Examples of the method for processing a point cloud according to the present disclosure have been described above in detail. It would be appreciated that, to implement the foregoing functions, a device for processing a point cloud may include a corresponding hardware structure and/or software module for performing each function. A person skilled in the art would appreciate that, the units and algorithm steps in each example described with reference to in some exemplary embodiments disclosed herein may be implemented in a form of hardware or a combination of hardware and computer software in the present disclosure. Whether a function is implemented by using hardware or implemented in a manner in which computer software drives hardware depends on particular applications and design constraint requirements of the technical solutions. A person skilled in the art may use different methods to implement the described functions for each particular application, but the implementation does not go beyond the scope of the present disclosure.

In the present disclosure, the device for processing a point cloud may be divided into functional units according to the above-mentioned method embodiments, for example, each function may be assigned to a functional unit, or two or more functions may be integrated into a functional unit. The above-mentioned functional unit may be implemented in a form of hardware or software. It should be noted that the division of the units in the present disclosure is schematic, and is merely logic function division; there may be other division manners in actual implementation.

Figure 3:
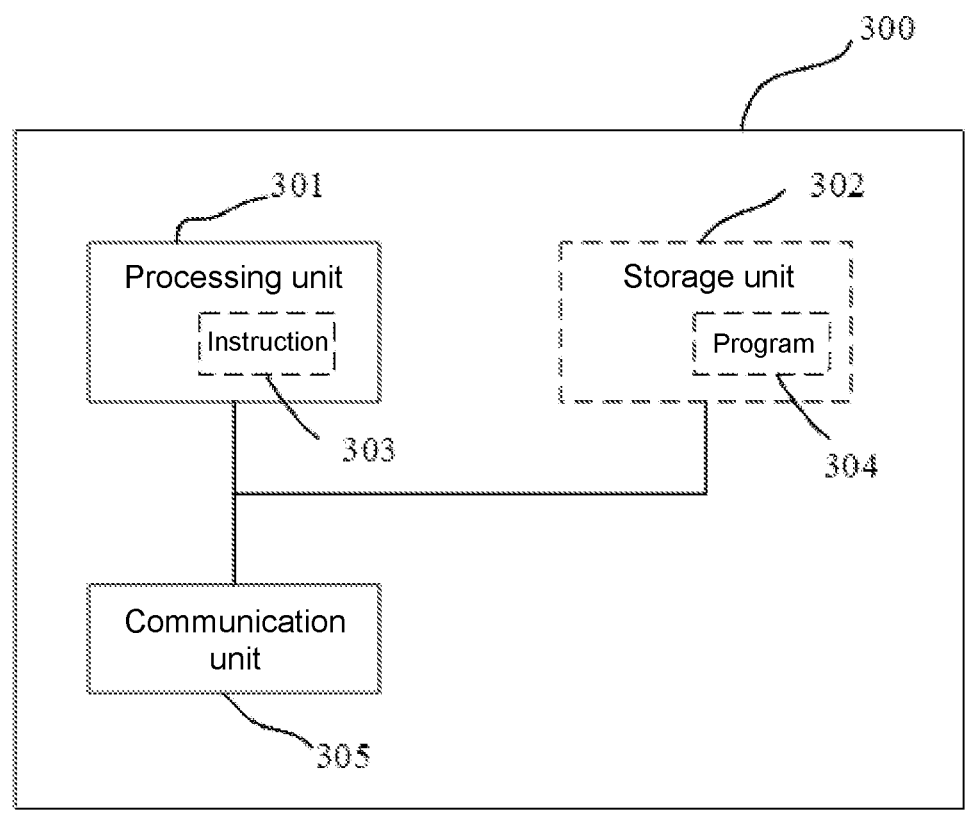
FIG. 3 is a schematic diagram of a device for processing a point cloud according to the present disclosure.

FIG. 3 shows a schematic structural diagram of a device for processing a point cloud according to the present disclosure. The dashed line in FIG. 3 indicates an optional unit. The device 300 may be configured to implement the method described herein. The device 300 may be configured as a software module, a chip, a terminal apparatus, or other electronic apparatuses.

The device 300 includes one or more processing units 301 which may support the device 300 to implement the method in the method embodiments corresponding to FIG. 1. The processing unit 301 may be configured as a software processing unit, a general-purpose processor, or a special-purpose processor. The processing unit 301 may be configured to control the device 300, execute a software program (for example, a software program containing the method 100), and process data (for example, the first point cloud). The device 300 may further include a communication unit 305 configured to realize input (reception) and output (transmission) of signals.

For example, the device 300 may be configured as a software module, and the communication unit 305 may be an interface function of the software module. The software modules may operate on a processor or control circuit.

In another example, the device 300 may be configured as a chip, the communication unit 305 may be configured as an input and/or output circuit of the chip or a communication interface of the chip, and the chip may serve as a component of a terminal apparatus or other electronic apparatuses.

In the device 300, the communication unit 305 may perform: acquiring a first point cloud; and acquiring an image of a same environment corresponding to the first point cloud.

The processing unit 301 may perform: resampling the first point cloud to obtain a second point cloud with a density lower than that of the first point cloud; registering the second point cloud and the image; and processing the second point cloud based on the image to generate a target point cloud containing a color(s).

It should be noted that the processing unit 301 may further include a resampling unit and a configuration unit, the resampling unit may be configured to resample the first point cloud, and the configuration unit may be configured to register the second point cloud and the image.

In some exemplary embodiments, the processing unit 301 may be specifically configured to: determine a point cloud block in the first point cloud with a point cloud density higher than a density threshold; and resample the point cloud block.

In some exemplary embodiments, the processing unit 301 may be specifically configured to: determine an edge of an object in the second point cloud based on the image; filter the second point cloud based on the edge to obtain a second point cloud with an increased density, where the second point cloud with the increased density include the edge; and determine a color of the second point cloud with an increased density according to the image.

In some exemplary embodiments, the processing unit 301 may be specifically configured to: delete an unnecessary point cloud block from the target point cloud when an environmental region corresponding to the target point cloud is larger than a preset environmental region, where an environmental region corresponding to the unnecessary point cloud block is located outside the preset environmental region.

In some exemplary embodiments, the processing unit 301 may be specifically configured to: identify an object in the target point cloud; and replace the object with a 3D model.

In some exemplary embodiments, the processing unit 301 may be further configured to: process the target point cloud to generate a mesh grid.

In some exemplary embodiments, the mesh grid may be composed of three adjacent points in the target point cloud.

In some exemplary embodiments, the processing unit 301 may be further configured to: render the target point cloud.

In some exemplary embodiments, the communication unit 305 may be specifically configured to: acquire a plurality of point clouds from a plurality of lidars; and the processing unit 301 may be further configured to: splice the plurality of point clouds into the first point cloud.

In some exemplary embodiments, the processing unit 301 may be specifically configured to: splice the plurality of point clouds into the first point cloud based on extrinsic parameters of the plurality of lidars.

In some exemplary embodiments, the extrinsic parameters may be used to indicate a positional relationship of a coordinate system of each of the plurality of lidars relative to a coordinate system of the mobile platform.

In some exemplary embodiments, the extrinsic parameters may include:

rotation parameters of the coordinate system of each of the plurality of lidars relative to the coordinate system of the mobile platform; and/or translation parameters of the coordinate system of each of the plurality of lidars relative to the coordinate system of the mobile platform.

In some exemplary embodiments, the processing unit 301 may be specifically configured to: splice the plurality of point clouds into the first point cloud using an ICP algorithm.

It will be clear to those skilled in the art that, for convenience and simplicity of description, reference may be made to the related description in the exemplary embodiments of FIG. 1 for specific operation processes and resulting effects of the above-mentioned device and units, which will not be repeated herein for brevity.

In some exemplary embodiments, the above-mentioned steps may be implemented by a logic circuit in a hardware form or an instruction (set) in a software form. For example, the processing unit 301 may be configured as a central processing unit (CPU), a digital signal processor (DSP), an application specific integrated circuit (ASIC), a field programmable gate array (FPGA), or another programmable logic device, such as a discrete gate, a transistor logic device, or a discrete hardware component.

The device 300 may include one or more storage units 302 storing a program 304 (for example, a software program containing the method 100), and the program 304 may be executable by the processing unit 301 to generate an instruction 303, such that the processing unit 301 may perform the method described in the above-mentioned method embodiments according to the instruction 303. In some exemplary embodiments, the storage unit 302 may further store data (for example, the first point cloud). In some exemplary embodiments, the processing unit 301 may also read the data stored in the storage unit 302, and the data may be stored at a same storage address as the program 304, or a different storage address from the program 304.

The processing unit 301 and the storage unit 302 may be disposed separately, or integrated together, for example, integrated on a single board or a system on chip (SOC).

The present disclosure further provides a computer program product which, when executed by the processing unit 301, may implement the method according to any of exemplary embodiments of the present disclosure.

The computer program product may be stored in the storage unit 302, and for example, is the program 304, and the program 304 is finally converted into an executable object file capable of being executed by the processing unit 301 through preprocessing, compiling, assembling, linking, and the like.

The computer program product may be transmitted from one computer readable storage medium to another, for example, from one website, computer, server, or data center to another in a wired (for example, coaxial cable, fiber optic, digital subscriber line (DSL)) or wireless (for example, infrared, wireless, microwave) manner.

The present disclosure further provides a computer readable storage medium (for example, the storage unit 302) having a computer program stored thereon, which, when executed by a computer, implements the method according to some exemplary embodiments of the present disclosure. The computer program may be a high-level language program or an executable target program.

The computer readable storage medium may be configured as a magnetic medium (for example, a floppy disk, a hard disk, or a magnetic tape), an optical medium (for example, a digital video disc (DVD)), or a semiconductor medium (for example, a solid state disk (SSD)), or the like. For example, the computer readable storage medium may be configured as a volatile memory or a non-volatile memory, or the computer readable storage medium may include both volatile and non-volatile memories. The non-volatile memory may be configured as a read-only memory (ROM), a programmable ROM (PROM), an erasable PROM (EPROM), an electrically EPROM (EEPROM), or a flash memory. The volatile memory may be configured as a random access memory (RAM) which serves as an external cache. By way of examples, but without limitation, many forms of RAMs are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

It should be understood that, in the present disclosure, the sequence numbers of the procedures do not imply an execution sequence, and the execution sequence of the procedures should be determined according to the functions and internal logic thereof. They are not intended to limit an implementation procedure of the embodiments of the present disclosure in any way.

The term "and/or" herein only describes an association relationship between associated objects, and indicates that three possible relationships may exist. For example, A and/or B may indicate three cases: only A exists; both A and B exist; and only B exists. In addition, in this disclosure, the symbol "/" generally indicates that associated objects have a relationship of "or".

The disclosed system, device, and method according to in some exemplary embodiments of the present disclosure may be implemented in other manners. For example, some features of the foregoing method embodiments may be ignored or not executed. The foregoing device embodiments are merely exemplary. The division of the units is merely logical function division and there may be other division manners in practical implementation. Plural units or components may be combined or integrated into another system. In addition, the coupling among the units or components may be direct coupling or indirect coupling, and may also be electrical, mechanical, or connection in other forms.

In summary, what is described above is merely part of embodiments of the present disclosure, and is not intended to limit the scope of protection of the present disclosure. Any modification, equivalent substitution and improvement made within the scope of the present disclosure are within the scope of the present disclosure.

What is claimed is:

1. A method for processing a point cloud, comprising:
obtaining a first point cloud of an environment;
obtaining an image of the environment taken by a camera;
resampling the first point cloud to obtain a second point cloud with a density lower than a density of the first point cloud;
registering the second point cloud and the image; and
processing the second point cloud according to the image to generate a colorful target point cloud with corresponding colors shown in the image, including:
  determining an object in the image of the environment corresponding to the first point cloud taken by the camera;
  determining a point cloud block in the second point cloud corresponding to the object in the image through an edge preserving filter algorithm, so as to determine an edge of the object in the second point cloud;
  filtering the second point cloud based on the edge to obtain a second point cloud with an increased density, wherein the second point cloud with the increased density includes the edge; and
  determining a color of the second point cloud with the increased density based on the image.

2. The method according to claim 1, wherein the resampling of the first point cloud includes:
determining a point cloud block in the first point cloud with a point cloud density higher than a density threshold; and
resampling the point cloud block.

3. The method according to claim 1, further comprising:
deleting an unnecessary point cloud block from the target point cloud upon determining that an environmental region corresponding to the target point cloud is larger than a preset environmental region,
wherein the unnecessary point cloud block corresponds to an environmental region located outside the preset environmental region.

4. The method according to claim 1, further comprising:
identifying an object in the target point cloud; and
replacing the object with a 3D model.

5. The method according to claim 1, further comprising:
processing the target point cloud to generate a mesh grid.

6. The method according to claim 5, wherein the mesh grid includes three adjacent points in the target point cloud.

7. The method according to claim 1, further comprising:
rendering the target point cloud.

8. The method according to claim 1, wherein the obtaining of the first point cloud includes:
acquiring a plurality of point clouds from a plurality of lidars; and
splicing the plurality of point clouds into the first point cloud.

9. The method according to claim 8, wherein the splicing of the plurality of point clouds into the first point cloud includes:
   splicing the plurality of point clouds into the first point cloud based on extrinsic parameters of the plurality of lidars.

10. The method according to claim 9, wherein the extrinsic parameters indicate a positional relationship between a coordinate system of each of the plurality of lidars and a coordinate system of a mobile platform.

11. The method according to claim 10, wherein the extrinsic parameters include at least one of:
   rotation parameters of the coordinate system of each of the plurality of lidars relative to the coordinate system of the mobile platform; or translation parameters of the coordinate system of each of the plurality of lidars relative to the coordinate system of the mobile platform.

12. The method according to claim 8, wherein the splicing of the plurality of point clouds into the first point cloud includes:
   splicing the plurality of point clouds into the first point cloud using an iterative closest point (ICP) algorithm.

13. A mobile platform, comprising:
   a point cloud sensor,
   a vision sensor;
   at least one storage medium storing a set of instructions for doing processing a point cloud; and
   at least one processor in communication with the at least one storage medium, wherein during operation, the at least one processor executes the set of instructions to:
   control the point cloud sensor to obtain a first point cloud,
   control the vision sensor to obtain an image, taken by a camera, of a same environment corresponding to the first point cloud,
   resample the first point cloud to obtain a second point cloud with a density lower than a density of the first point,
   register the second point cloud and the image, and
   process the second point cloud according to the image to generate a colorful target point cloud with corresponding colors shown in the image, including:
   determining an object in the image of the environment corresponding to the first point cloud taken by the camera;
   determining a point cloud block in the second point cloud corresponding to the object in the image through an edge preserving filter algorithm, so as to determine an edge of the object in the second point cloud;
   filtering the second point cloud based on the edge to obtain a second point cloud with an increased density, wherein the second point cloud with the increased density includes the edge; and
   determining a color of the second point cloud with the increased density based on the image.

14. The mobile platform according to claim 13, wherein the at least one processor further executes the set of instructions to:
   determine a point cloud block in the first point cloud with a point cloud density higher than a density threshold; and
   resample the point cloud block.

15. The mobile platform according to claim 13, wherein the at least one processor further executes the set of instructions to:
   delete an unnecessary point cloud block from the target point cloud upon determining that an environmental region corresponding to the target point cloud is larger than a preset environmental region, wherein the unnecessary point cloud block corresponds to an environmental region located outside the preset environmental region.

16. The mobile platform according to claim 13, wherein the at least one processor further executes the set of instructions to:
   identify an object in the target point cloud; and
   replace the object with a 3D model.

17. The mobile platform according to claim 13, wherein the at least one processor further executes the set of instructions to:
   process the target point cloud to generate a mesh grid.

18. The mobile platform according to claim 17, wherein the mesh grid includes three adjacent points in the target point cloud.

* * * * *